(12) United States Patent
Douglass et al.

(10) Patent No.: US 6,644,350 B1
(45) Date of Patent: Nov. 11, 2003

(54) VARIABLE PRESSURE SOLENOID CONTROL VALVE

(75) Inventors: John Michael Douglass, Algonquin, IL (US); Paul Anders Christensen, Whitehall, MI (US)

(73) Assignee: Acutex, Inc., Whitehall, MI (US)

( * ) Notice: Subject to any disclaimer, the term of this patent is extended or adjusted under 35 U.S.C. 154(b) by 0 days.

(21) Appl. No.: 09/579,546

(22) Filed: May 26, 2000

(51) Int. Cl.[7] .................... F15B 13/043; F15B 13/044
(52) U.S. Cl. ...................... 137/625.64; 137/596.17
(58) Field of Search ................ 137/14, 596.17, 137/625.61, 625.64

(56) References Cited

U.S. PATENT DOCUMENTS

| | | | | |
|---|---|---|---|---|
| 3,286,734 A | * | 11/1966 | Hartshorne | 137/625.64 |
| 3,874,406 A | | 4/1975 | Loewis | |
| 4,063,568 A | | 12/1977 | Sosulnikov et al. | |
| 4,391,292 A | * | 7/1983 | Millar | 137/596.17 |
| 4,579,145 A | * | 4/1986 | Leiber et al. | 137/625.65 |
| 4,595,035 A | * | 6/1986 | Warrick | 137/625.65 |
| 4,610,267 A | * | 9/1986 | Beck et al. | 137/596.17 |
| 4,617,968 A | * | 10/1986 | Henderixon | 137/625.64 |
| 4,674,536 A | * | 6/1987 | Warrick | 137/596.17 X |
| 4,966,195 A | * | 10/1990 | McCabe | 137/625.64 X |
| 5,051,631 A | * | 9/1991 | Anderson | 137/625.61 X |
| 5,054,599 A | * | 10/1991 | Marcott | 137/625.64 X |
| 5,174,338 A | * | 12/1992 | Yokota et al. | 137/625.64 |
| 5,184,644 A | * | 2/1993 | Wade | 137/625.64 |
| 5,261,455 A | * | 11/1993 | Takahashi et al. | 137/625.64 |
| 5,447,288 A | * | 9/1995 | Keuerleber et al. | 251/129.17 |
| 5,611,370 A | * | 3/1997 | Najomolhoda | 137/625.64 X |
| 5,707,039 A | * | 1/1998 | Hamilton et al. | 251/129.17 |
| 5,711,344 A | * | 1/1998 | Mullally | 137/596.17 |
| 5,836,335 A | * | 11/1998 | Harms | 137/625.64 X |
| 5,913,577 A | * | 6/1999 | Arndt | 137/635.64 X |
| 5,950,984 A | * | 9/1999 | Anderson et al. | 137/596.17 X |
| 5,984,259 A | * | 11/1999 | Najmolhoda et al. | 137/625.64 |
| 6,029,703 A | * | 2/2000 | Erickson et al. | 137/625.61 |
| 6,068,237 A | | 5/2000 | Holmes et al. | |
| 6,152,422 A | * | 11/2000 | Staib et al. | 137/596.17 |
| 6,273,122 B1 | | 8/2001 | Schudt et al. | |
| 6,328,065 B1 | * | 12/2001 | Schmid et al. | 137/596.17 |
| 6,418,967 B1 | * | 7/2002 | Frei et al. | 137/596.17 |

FOREIGN PATENT DOCUMENTS

| | | | |
|---|---|---|---|
| DE | 87 09 320 U | 11/1988 | |
| DE | 42 21 821 A1 | * 1/1994 | 251/129.14 |
| DE | 19733660 A1 | 2/1999 | |
| GB | 866 778 A | 5/1961 | |
| JP | 11 210920 A | 8/1999 | |

OTHER PUBLICATIONS

International Publication No. WO 98/48322 published Oct. 20, 1998.*

* cited by examiner

*Primary Examiner*—Gerald A. Michalsky
(74) *Attorney, Agent, or Firm*—Haynes and Boone LLP

(57) ABSTRACT

A variable pressure solenoid (VPS) control valve. The VPS control valve includes an hydraulic section and a magnetic section. The hydraulic section includes a movable valve that receives a pressurized fluid and generates a control pressure, and the magnetic section controls the operation of the movable valve. The movable valve includes an inlet ball valve for limiting the flow of pressurized fluid into the hydraulic section and an exhaust valve for limiting the exhaust of pressurized fluid out of the hydraulic section. The magnetic section includes a spring-biased armature, and an electromagnetic coil for generating a variable electromagnetic field in response to an electrical input signal for moving the spring biased armature.

9 Claims, 3 Drawing Sheets

VARIABLE PRESSURE SOLENOID CONTROL VALVE

TECHNICAL FIELD

This invention relates generally to a control valve for regulating fluid pressure, and in particular to a variable pressure solenoid control valve.

BACKGROUND OF THE INVENTION

Modern automotive transmissions typically require precise electro-hydraulic solenoid valves in order to regulate the hydraulic pressure within the various clutches and spool valves typically employed in such transmissions. The types of solenoid valves commonly employed in flow control valves used in automotive transmissions include: on/off solenoid valves, pulse-width-modulated (PWM) solenoid valves, and variable pressure solenoid (VPS) control valves. Historically automotive manufacturers have chosen to use only a single VPS control valve in their flow control valves that acts as a line-pressure regulation valve. However, in an effort to simplify the calibration of the transmissions and improve the shift quality, automotive manufacturers are now choosing to incorporate the use of several VPS control valves; electing to use them not only for line pressure regulation but also for clutch pressurization and depressurization.

Conventional VPS control valves provide a low control pressure by bleeding-off control pressure to an exhaust downstream from a very small upstream orifice. This method suffers from a number of problems. The first problem is excessive leakage. When only a single 2-port bleeding-off style VPS control valve is used in a transmission, the transmission fluid pump is capable of maintaining pressure even with this leakage; however, when several of these VPS control valves are used in a single transmission, the pump is no longer capable of making-up for the leakage. The second problem that is present in the current 2-port bleeding-off style VPS control valves is that the valves are not capable of reducing control pressure to zero in a normally-high pressure configuration.

The present invention is directed to overcoming one or more of the limitations of existing variable pressure solenoid control valves.

SUMMARY OF THE INVENTION

According to one embodiment of the invention, a proportional variable pressure solenoid valve for controlling the pressure of a pressurized fluid in a hydraulic system in proportion to the current level of an electrical input signal is provided that includes a movable valve for controlling the pressure of the pressurized fluid in the hydraulic system, a solenoid for controlling the movement of the movable valve, and a common housing. The movable valve includes an inlet valve for controlling the flow of pressurized fluid into the solenoid valve, and an exhaust valve for controlling the exhaust of pressurized fluid from the solenoid valve. The solenoid includes a spring biased armature for displacing the movable valve, and an electromagnetic coil for generating a variable electromagnetic field in response to the electrical input signal for moving the spring biased armature.

According to another embodiment of the invention, a fluid control device for an automotive transmission is provided that includes a pump for generating a pressurized fluid, a spool valve operably coupled to the pump for controllably conveying the pressurized fluid from the pump to another hydraulic device, the spool valve including a pilot port for receiving a control pressure for controlling the operation of the spool valve, and a proportional variable pressure solenoid valve for receiving the pressurized fluid and generating the control pressure for controlling the operation of the spool valve in proportion to the current level of an electrical input signal. The proportional variable pressure solenoid valve includes a movable valve for controlling the pressure of the control pressure in the hydraulic system, a solenoid for controlling the movement of the movable valve, and a common housing. The movable valve includes an inlet valve for controlling the flow of pressurized fluid into the solenoid valve, and an exhaust valve for controlling the exhaust of pressurized fluid from the solenoid valve. The solenoid includes a spring biased armature for displacing the movable valve, and an electromagnetic coil for generating a variable electromagnetic field in response to the electrical input signal for moving the spring biased armature.

According to another embodiment of the invention, a method of operating a variable pressure solenoid control valve for generating a control pressure for controlling the operation of an hydraulic device using a pressurized fluid in an hydraulic system in proportion to the current level of an electrical input signal, the variable pressure control valve including an hydraulic section including a movable valve for controlling the pressure of the control pressure and a magnetic section including a solenoid for controlling the operation of the movable valve, that includes controllably inputting pressurized fluid into the movable valve through a first port, outputting the control pressure from the movable valve through a second port, and controllably exhausting pressurized fluid from the movable valve through a third port.

The present embodiments of the invention provide a number of advantages. For example the variable pressure solenoid control valves control the pressure of a pressurized fluid in a hydraulic system in proportion to the current level of an electrical input signal by using a 3-port movable valve that includes an inlet ball valve and an exhaust ball valve. In this manner, the control pressure provided by the variable pressure solenoid control valves can be reduced to zero in a normally high pressure or normally low pressure configuration. Moreover, in the normally high and low pressure configurations, when the control pressure is reduced to zero there is no leakage, and in the normally low pressure configuration, when the control pressure is a maximum, the leakage is minimized. Thus, the present embodiments of the invention provide variable pressure solenoid control valves having increased efficiency and improved operational performance.

DETAILED DESCRIPTION OF THE PREFERRED EMBODIMENT

Figure 1:
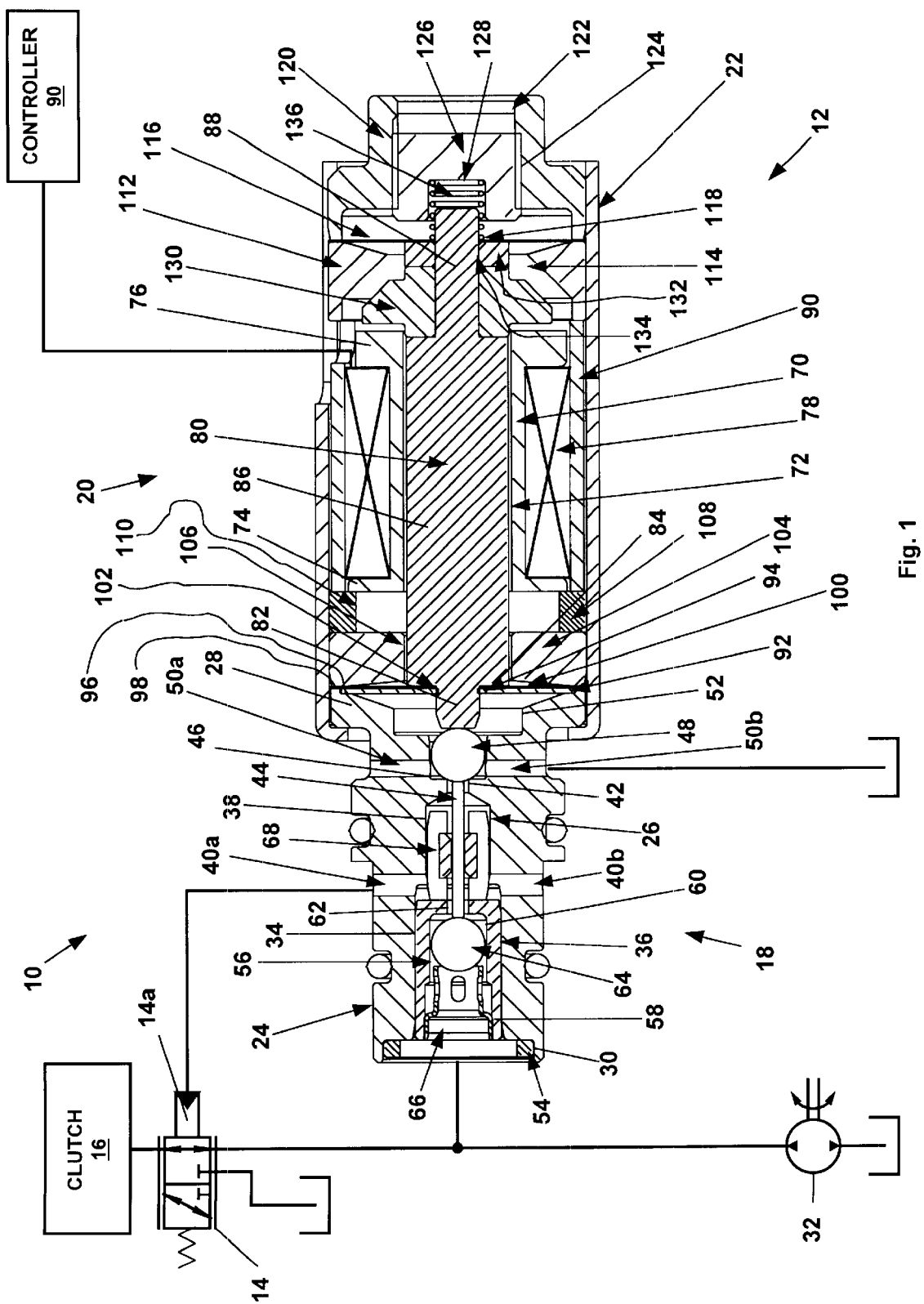
FIG. 1 is an illustration of an embodiment of an automotive transmission including a VPS control valve for controlling the operation of a spool valve for pressurizing and depressurizing a clutch.

Referring to FIG. 1, the reference numeral 10 refers, in general, to an automatic transmission according to an embodiment of the invention that includes a VPS control valve 12 for controlling the operation of a conventional spring biased 3-port spool valve 14 including a pilot port 14a for pressurizing or depressurizing a conventional clutch 16.

The VPS control valve includes an hydraulic section 18 for generating a variable control pressure for controlling the operation of the spool valve 14 and a magnetic section 20 for controlling the operation of the hydraulic section that are connected by a common housing 22 formed of a ferromagnetic material.

The hydraulic section 18 includes a body 24 defining a central through bore 26 and having an annular flange 28 that is received within an end of the housing 22. The bore 26 includes a inlet 30 for receiving a pressurized fluid from a pump 32, an inlet seating passage 34 for receiving and supporting an inlet seating member 36, a control exhaust passage 38 for exhausting a portion of the pressurized fluid into radially oriented control exhaust passages 40a and 40b, a pintle passage and orifice 42 for receiving an end of a pintle 44 and limiting the rate of fluid flow, an exhaust seat 46 for receiving an exhaust ball valve 48 and exhausting a portion of the pressurized fluid into exhaust passages 50a and 50b, and an opening 52. A disc filter 54 is also received within the inlet 30 of the bore 26 for filtering foreign materials out of the pressurized fluid.

The inlet seating member 36 defines a central through bore 56 that includes an inlet 58 at one end for receiving the pressurized fluid, and an inlet seat 60 and a pintle opening and orifice 62 at another end for receiving an inlet ball valve 64 and receiving another end of the pintle 44 and limiting the rate of fluid flow, respectively. A inlet ball valve stop 66 is supported in the inlet 60 of the bore 56 for limiting the movement of the inlet ball valve 64. A pintle support member 68 slidingly supports a middle portion of the pintle 44 and is received within the control exhaust passage 38 for supporting the pintle 44 within the control exhaust passage 38.

The magnetic section 20 includes a non-metallic bobbin 70 defining a central through bore 72 and including annular flanges, 74 and 76, at opposite ends. An electromagnetic coil 78 is wound around the bobbin 70 between the annular flanges 74 and 76 for generating a variable magnetic field in response to a variable current and thereby actuating an armature 80 formed of a ferromagnetic material. The armature 80 is received within the bore 72 and includes a reduced diameter end member 82, a shoulder 84, a main body 86, and a reduced diameter end member 88. A sleeve 90 surrounds and contains the bobbin 70, coil 78, and armature 80 within the housing 22. A controller 90 is operably coupled to the coil 78 for controlling the operation of the coil by supplying a variable current.

A flat diaphragm 92 defining a central through bore 94 for receiving the end member 82 of the armature 80 is positioned within a recessed portion 96 of the end face 98 of the annular flange 28 of the body 24 within the housing 22. A suspension washer 100 defining a central through bore 102 for receiving the end member 82 of the armature 80 is positioned proximate an end face of the flat diaphragm 92 and the shoulder 84 of the armature 80 within the housing 22. A flux washer 104 defining a central through bore 106 for receiving the main body of the armature 80 is positioned proximate the end face 98 of the annular flange 28 of the body 24 and the end face of suspension washer 100 within the housing 22 for concentrating the electromagnetic flux of the coil 78 at the front end of the armature 80. A wave washer 108 defining a central through bore 110 for receiving the main body 86 of the armature 80 is positioned proximate an end face of the flux washer 104 and the end faces of the annular flange 74 of the bobbin 56 and the sleeve 76 within the housing 22.

A polepiece 112 formed of a ferromagnetic material and defining a central through bore 114 for receiving the end member 88 of the armature 80 is positioned proximate the end faces of the annular flange 76 of the bobbin 70 and the sleeve 90 within the housing 22. A resilient suspension washer 116 defining a central through bore 118 for receiving the end member 88 of the armature 80 is positioned proximate an end face of the polepiece 112 within the housing 22. A calibration hub 120 defining a central through bore 122 that includes a internally threaded portion 124 is positioned proximate to an end face of the suspension washer 116 and also connected to and positioned within an end portion of the housing 22. A spring calibration screw member 126 is positioned within the bore 122 that includes a central cavity 128 and threadedly coupled to the threaded portion 124 of the calibration hub 120.

An annular armature ring 130 formed of a ferromagnetic material is connected to the end member 88 of the armature 80 proximate the end face of the main body 86 of the armature and received within the pole piece 112. As will be recognized by persons having ordinary skill in the art, the variable magnetic field generated by the coil 78 is coupled to the polepiece 112 through the housing 22 thereby actuating the armature 80 and ring armature 130 in the direction of the polepiece 112. In this manner, the positioning of the ring armature 130 relative to the coil 78 and the polepiece 112 controls the mode of operation of the VPS control valve 12.

An annular spacing ring 132 defining a central through bore 134 for receiving the end member 88 of the armature 80 is positioned between opposite end faces of the suspension washer 116 and armature ring 130. A spring 136 is positioned between the end face of the suspension washer 116 and the end face of the central cavity 128 of the screw member 126 in order to apply a biasing spring force on the armature 80.

In an exemplary embodiment, during operation of the transmission 10, the pump 32 supplies a pressurized fluid to the inlet 30 of the body 24 of the VPS control valve 12 and the inlet of the spool valve 14. Depending upon the longitudinal spacings between the inlet ball valve 64 and the exhaust ball valve 48 and the inlet seat 60 and exhaust seat 46, respectively, the level of control pressure exhausted from the exhaust passage 40 a of the body 24 of the VPS control valve 12 to the pilot port 14a of the spool valve 14 is varied. In this manner, the spool valve 14 controllably pressurizes or depressurizes the clutch 16.

In particular, in an exemplary embodiment, during operation of the VPS control valve 12, the controller 90 supplies a variable current to the coil 78 in order to generate a variable magnetic field. Depending upon the level of the current supplied, the armature 80 and armature ring 130 are displaced in the longitudinal direction from left-to-right in the direction of the polepiece 112 and against the biasing force provided by the spring 136 in the longitudinal direction from right-to-left due to the variable magnetic field generated by the coil 78. In parallel the pressurized fluid injected into the inlet 30 of the body 24 of the VPS control valve 12 applies a fluid force onto the inlet ball valve 64 in the longitudinal direction from left-to-right. The applied fluid force in turn is transmitted from the inlet ball valve 64 to the pintle 44, exhaust ball valve 48, the end face of the end member 82 of the armature 80 and the spring 136. In this manner, the applied fluid force maintains the movable members, the inlet ball valve 64, the pintle 44, the exhaust ball valve 48, and the armature 80 in contact with one another and applies a substantially constant force on the armature 80. Furthermore, because the end face of the end member 82 of the armature 80 impacts the exhaust ball valve 48, the longitudinal displacement of the armature 80 in turn displaces in turn the exhaust ball valve 48, pintle 44, and inlet ball valve 64. In addition, the longitudinal spacings between the inlet ball valve 64 and exhaust ball valve 48 and the inlet and outlet seats, 60 and 46, respectively, determine the level of control pressure exhausted from the exhaust passage 40a of the body 24 of the VPS control valve 12 to the pilot port 14a of the spool valve 14. In particular, as increasing amounts of the pressurized fluid injected into the inlet 30 of the body 24 of the VPS control valve 12 are exhausted out of the exhaust passage 50b of the body of the VPS control valve, the amount of control pressure exhausted from the exhaust passage 40a of the body 24 of the VPS control valve 12 to the pilot port 14a of the spool valve 14 is decreased.

In an exemplary embodiment, the VPS control valve 12 is calibrated to provide the following operational characteristics:

| SUPPLY PRESSURE TO INLET 30 | CURRENT SUPPLIED TO COIL 78 | LONGITUDINAL SPACING BETWEEN INLET BALL VALVE 64 AND INLET SEAT 60 | LONGITUDINAL SPACING BETWEEN EXHAUST BALL VALVE 48 AND EXHAUST SEAT 46 | CONTROL PRESSURE SUPPLIED TO PILOT PORT 14a OF SPOOL VALVE 14 |
|---|---|---|---|---|
| 120 psi | 0 amps | 0.015 inches | 0.001 inches | approx. 90 psi |
| 120 psi | 1 amp | 0.000 inches | 0.016 inches | 0 psi |

Note that when the level of current supplied to the coil 78 by the controller 90 is equal to 0 amps, the spring biasing force provided by the spring 136 is substantially equal to the fluid force applied to the inlet ball valve 64, pintle 44, exhaust ball valve 48, and armature 80, the air gap between the armature ring 130 and the polepiece 112 is a maximum, and the magnetic force is zero. Furthermore, note that when the level of current supplied to the coil 78 by the controller 90 is equal to 1 amp, the spring force is a maximum and opposing the magnetic force, and the air gap between the armature ring 130 and the polepiece 112 is reduced by approximately 0.016 inches. In addition, note that when the control pressure is equal to zero, there is no leakage of fluid from the VPS control valve 12. Finally, note that, for intermediate levels of supplied current, the longitudinal displacement between the inlet and exhaust ball valves, 64 and 48, and the inlet and exhaust seats, 64 and 46, respectively, is proportional to the level of current supplied to the coil 78. Thus, in this configuration, the VPS control valve 12 provides a normally high control pressure mode of operation.

Figure 2:
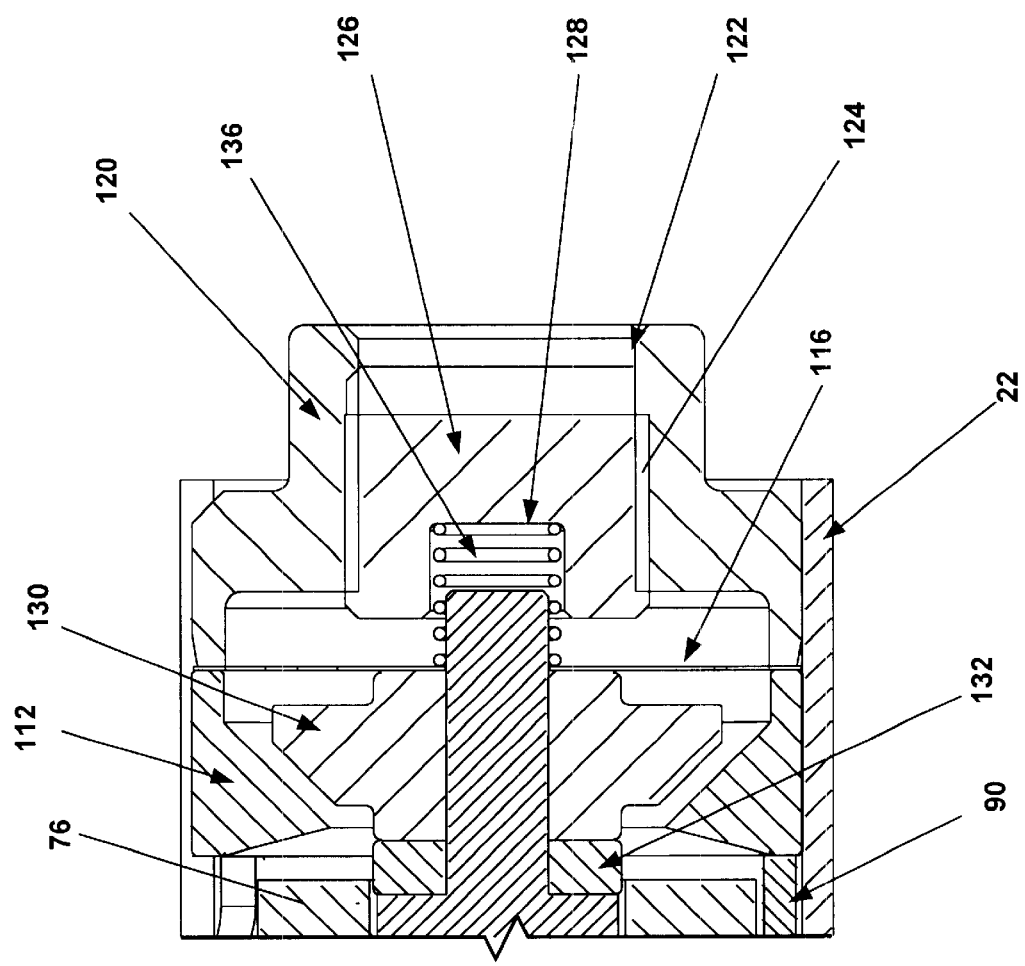
FIG. 2 is an illustration of an alternative embodiment of the VPS control valve of FIG. 1.

Referring to FIG. 2, the reference numeral 140 refers, in general, to an alternative embodiment of a VPS control valve for use in the system 10 for controlling the operation of the conventional 3-port spool valve 14 for pressurizing or depressurizing the conventional clutch 16. The design and operation of the VPS control valve 140 is substantially identical to the VPS control valve 12 except that: (1) the orientation of the polepiece 112 is reversed; (2) the orientation of the ring armature 130 is reversed; and (3) the relative positions of the ring armature 130 and annular spacing ring 132 are reversed. In this manner, the VPS control valve 140 provides a normally low control pressure mode of operation.

In an exemplary embodiment, during operation of the transmission 10, the pump 32 supplies a pressurized fluid to the inlet 30 of the body 24 of the VPS control valve 140 and the inlet of the spool valve 14. Depending upon the longitudinal spacings between the inlet ball valve 64 and the exhaust ball valve 48 and the inlet seat 60 and exhaust seat 46, respectively, the level of control pressure exhausted from the exhaust passage 40a of the body 24 of the VPS control valve 12 to the pilot port 14a of the spool valve 14 is varied. In this manner, the spool valve 14 controllably pressurizes or depressurizes the clutch 16.

In particular, in an exemplary embodiment, during operation of the VPS control valve 140, the controller 90 supplies a variable current to the coil 78 in order to generate a variable magnetic field. Depending upon the level of the current supplied, the armature 80 and armature ring 130 are displaced in the longitudinal direction from right-to-left towards the polepiece 112 due to the variable magnetic field generated by the coil 78. In parallel, the pressurized fluid injected into the inlet 30 of the body 24 of the VPS control valve 140 applies a fluid force onto the inlet ball valve 64 in the direction from left-to-right. The applied fluid force in turn is transmitted from the inlet ball valve 64 to the pintle 44, exhaust ball valve 48, the end face of the end member 82 of the armature, and the spring 136. In this manner, the applied fluid force maintains the movable members, the inlet ball valve 64, the pintle 44, the exhaust ball valve 48, and the armature 80 in contact with one another and a substantially constant force is applied to the armature 80. Furthermore, because the end face of the end member 82 of the armature 80 impacts the exhaust ball valve 48, the longitudinal displacement of the armature 80 in turn displaces in turn the exhaust ball valve 48, pintle 44, and inlet ball valve 64. In addition, the longitudinal spacings between the inlet ball valve 64 and exhaust ball valve 48 and the inlet and outlet seats, 60 and 46, respectively, determine the level of control pressure exhausted from the exhaust passage 40 a of the body 24 of the VPS control valve 140 to the pilot port 14a of the spool valve 14. In particular, as increasing amounts of the pressurized fluid injected into the inlet 30 of the body 24 of the VPS control valve 140 are exhausted out of the exhaust passage 50b of the body of the VPS control valve, the amount of control pressure exhausted from the exhaust passage 40a of the body 24 of the VPS control valve 140 to the pilot port 14a of the spool valve 14 is decreased.

In an exemplary embodiment, the VPS control valve 140 is calibrated to provide the following operational characteristics:

| SUPPLY PRESSURE TO INLET 30 | CURRENT SUPPLIED TO COIL 78 | LONGITUDINAL SPACING BETWEEN INLET BALL VALVE 64 AND INLET SEAT 60 | LONGITUDINAL SPACING BETWEEN EXHAUST BALL VALVE 48 AND EXHAUST SEAT 46 | CONTROL PRESSURE SUPPLIED TO PILOT PORT 14a OF SPOOL VALVE 14 |
|---|---|---|---|---|
| 120 psi | 1 amp | 0.015 inches | 0.001 inches | 90 psi |
| 120 psi | 0 amp | 0.000 inches | 0.016 inches | 0 psi |

Note that when the level of current supplied to the coil 78 by the controller 90 is equal to 1 amp, the magnetic force is substantially equal to the fluid force applied to the inlet ball valve 64, pintle 44, exhaust ball valve 48, and armature 80, and the air gap between the armature ring 130 and the polepiece 112 is a minimum. Furthermore, note that when the level of current supplied to the coil 78 by the controller 90 is equal to 0 amp, the spring force is a maximum and opposing the fluid force, and the air gap between the armature ring 130 and the polepiece 112 is increased by approximately 0.016 inches. In addition, note that when the control pressure is equal to zero, there is no leakage of fluid from the VPS control valve 140. Finally, note that, for intermediate levels of supplied current, the longitudinal displacement between the inlet and exhaust ball valves, 64 and 48, and the inlet and exhaust seats, 64 and 46, respectively, is proportional to the level of current supplied to the coil 78. Thus, in this configuration, the VPS control valve 140 provides a normally low control pressure mode of operation.

Figure 3:
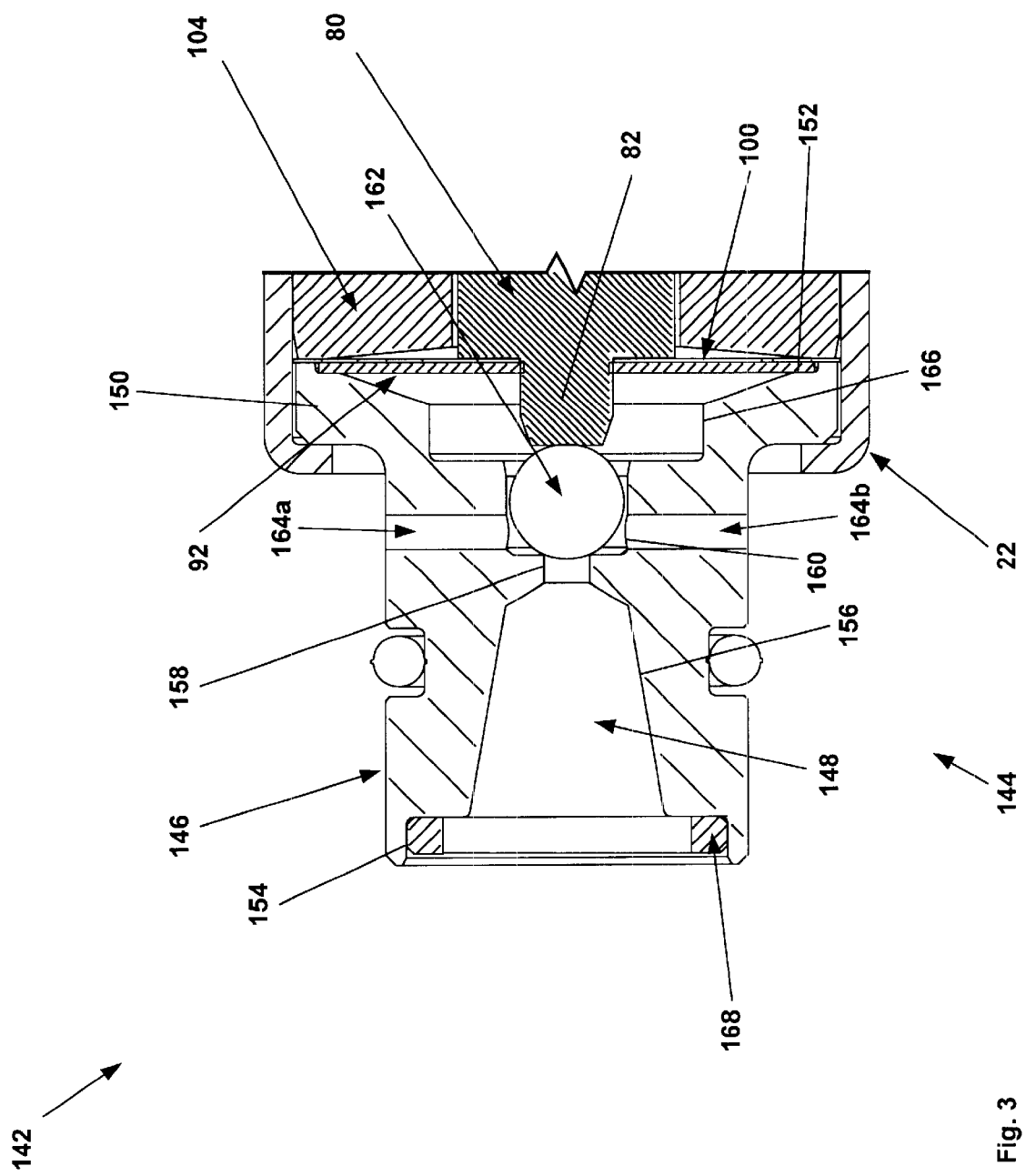
FIG. 3 is an illustration of an alternative embodiment of the VPS control valve of FIG. 1.

Referring to FIG. 3, the reference numeral 142 refers, in general, to an alternative embodiment of a VPS control valve for use in the transmission 10 for controlling the operation of the conventional 3-port spool valve 14 for pressurizing or depressurizing the conventional clutch 16. The design and operation of the VPS control valve 142 is substantially identical to the VPS control valve 12 except that the hydraulic section 18 is replaced with an hydraulic section 144 that includes a body 146 defining a central through bore 148 and having an annular flange 150 including a recess 152 for receiving the flat diaphragm 92 that is received within an end of the housing 22.

The bore 148 includes a inlet 154 for receiving a pressurized fluid from the pump 32, an inlet chamber 156, an orifice 158, an exhaust seat 160 for receiving an exhaust ball valve 162 and exhausting a portion of the pressurized fluid into exhaust passages 164a and 164b, and an opening 166 for receiving the end member 102 of the armature 80. A disc filter 168 is also received within the inlet 154 of the bore 148 for filtering foreign materials out of the pressurized fluid.

In an exemplary embodiment, during operation of the transmission 10, the pump 32 supplies a control pressure to the inlet 154 of the body 146 of the VPS control valve, 142 and the pilot port 14a of the spool valve 14. Depending upon the longitudinal spacing between the exhaust ball valve 162 and the exhaust seat 160, the level of control pressure provided to the pilot port 14a of the spool valve 14 is varied by controllably bleeding off the control pressure. In parallel, a pressurized supply of fluid is provided to the inlet of the spool valve 14. In this manner, the spool valve 14 controllably pressurizes or depressurizes the clutch 16.

In particular, during operation of the VPS control valve 142, the controller 90 supplies a variable current to the coil 78 in order to generate a variable magnetic field. Depending upon the level of the current supplied, the armature 80 and armature ring 130 are displaced in the longitudinal direction from right-to-left towards the polepiece 112 due to the variable magnetic field generated by the coil 78. In parallel, the pressurized fluid injected into the inlet 154 of the body 146 of the VPS control valve 142 applies a fluid force onto the exhaust ball valve 162 in the longitudinal direction from left-to-right. The applied fluid force in turn is transmitted from the exhaust ball valve 162 to the end face of the end member 82 of the armature 80, and the spring 136. In this manner, the applied fluid force maintains the movable members, the exhaust ball valve 162 and the armature 80 in contact with one another and a substantially constant force is applied to the armature 80. Furthermore, because the end face of the end member 82 of the armature 80 impacts the exhaust ball valve 162, the longitudinal displacement of the armature 80 in turn displaces the exhaust ball valve 162. In addition, the longitudinal spacing between the exhaust ball valve 162 and the outlet seat 160 determines the level of control pressure exhausted from the exhaust passage 164a of the body 146 of the VPS control valve 142 to a fluid reservoir.

In an alternative embodiment of the transmission 10, the pump 32 supplies a pressurized fluid to the inlet 154 of the body 146 of the VPS control valve 142 and the inlet of the spool valve 14. Depending upon the longitudinal spacing between the exhaust ball valve 162 and the exhaust seat 160, a variable control pressure is exhausted to the pilot port 14a of the spool valve 14 from the exhaust passage 164a of the body 146 of the VPS control valve 142. In this manner, the spool valve 14 controllably pressurizes or depressurizes the clutch 16.

In an exemplary embodiment, during assembly of the VPS control valves 18, 140, and 142, the wave washer 108 and sleeve 90 support the pole-piece 112 while the calibration hub 120 is positioned into place within the housing 22 thereby setting the magnetic air-gap between the ring armature 130 and the pole-piece 112. In this manner, all component tolerances are nullified and adjusted out of the completed VPS control valves 18 and 140. Once the maximum air-gap has been set, the housing 22 is crimped-inward from the sides fixing the position of the flux-washer 104, the pole-piece 112 and the calibration hub 120 relative to the housing 22.

In addition, during assembly of the VPS control valves 18 and 140, the adjustment of the position of the inlet seating member 36 within the inlet seating passage 34 of the body 24, all component tolerances are nullified and adjusted out of the assembly. In particular, the inlet seating member 36 is pushed into the body 24, thereby displacing the pintle 44 and pintle support 68, until the exhaust ball valve 48 is pushed away from the exhaust seat 46 the desired distance. In this manner, the travel of the ball valves 64 and 48 are determined in the VPS control valves 18 and 140.

The present embodiment of the VPS valves provide a number of advantages. For example the variable pressure solenoid control valves can control the pressure of a pressurized fluid in a hydraulic system in proportion to the current level of an electrical input signal by using a 3-port movable valve that includes an inlet ball valve and an exhaust ball valve. In this manner, the control pressure provided by the variable pressure solenoid control valves can be reduced to zero in a normally high pressure or normally low pressure configuration. Moreover, in the normally high or low pressure configurations, when the control pressure is reduced to zero there is no leakage, and in the normally low pressure configuration, when the control pressure is a maximum, the leakage is minimized. Thus, the present embodiments of the invention provide variable pressure solenoid control valves having increased efficiency and improved operational performance.

It is understood that variations may be made in the foregoing without departing from the scope of the invention. For example, the VPS valves of the present disclosure can be incorporated into a valve module in an automatic transmission by replacing the body 24 or 146 with a cast or molded body that is common to all of the valves in the valve module. Furthermore, the exhaust ball valves 48 and 162 may be omitted, and the end member 82 of the armature 80 modified to be received within the exhaust seat 46 to thereby directly control the exhaust of pressurized fluids from the VPS control valves 12, 140 and 142.

Although illustrative embodiments of the invention have been shown and described, a wide range of modification, changes, and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A fluid control device for an automotive transmission, comprising:

a pump for generating a pressurized fluid;

a spool valve operably coupled to the pump for controllably conveying the pressurized fluid from the pump to another hydraulic device, the spool valve including a pilot port for receiving a control pressure for controlling the operation of the spool valve; and a proportional variable pressure solenoid valve for receiving the pressurized fluid and generating the control pressure for controlling the operation of the spool valve in proportion to the current level of an electrical input signal, including:

a movable valve for controlling the pressure of the control pressure, the movable valve including:
      an inlet valve for controlling the flow of the pressurized fluid into the solenoid valve; and
      an exhaust valve for controlling the exhaust of the pressurized fluid from the solenoid valve;

a solenoid for controlling the movement of the movable valve, the solenoid including:
      an armature spring biased at a first end and engaged with the exhaust valve at a second end for transmitting force in one direction for displacing the movable valve;
      the second end of the armature engaged with a diaphragm member in abutment with a suspension member;
      a flux member receiving the second end of the armature;
      a wave washer mounted adjacent the flux member; and
      an electromagnetic coil for generating a variable electromagnetic field in response to the electrical input signal for moving the spring biased armature; and
      a common housing.

2. The device of claim 1, wherein the inlet valve and the exhaust valve are removably coupled.

3. The device of claim 1, wherein the inlet valve and the exhaust valve are free-floating.

4. The device of claim 1, wherein the inlet valve and the exhaust valve are adapted to be biased in the same direction.

5. The device of claim 1, wherein when the current level of the electrical input signal is zero, the control pressure is a maximum.

6. The device of claim 1, wherein as the current level of the electrical input signal is increased above zero, the control pressure decreases.

7. The device of claim 1, wherein when the current level of the electrical input signal is zero, the control pressure is a minimum.

8. The device of claim 1, wherein when the current level of the electrical input signal is increased above zero, the control pressure increases.

9. The device of claim 1, wherein when the control pressure is substantially equal to zero, there is substantially no leakage of pressurized fluid from the solenoid valve.

* * * * *